US010236623B1

(12) United States Patent
Cairns

(10) Patent No.: US 10,236,623 B1
(45) Date of Patent: Mar. 19, 2019

(54) CONNECTOR FOR SEALABLY ENGAGING AND DISENGAGING CONTACTS, AND METHODS OF MAKING AND/OR USING SAME

(71) Applicant: Pontus Subsea Connectors LLC, Ormond Beach, FL (US)

(72) Inventor: James L. Cairns, Ormond Beach, FL (US)

(73) Assignee: Pontus Subsea Connectors LLC, Ormond Beach, FL (US)

( * ) Notice: Subject to any disclaimer, the term of this patent is extended or adjusted under 35 U.S.C. 154(b) by 0 days.

(21) Appl. No.: 16/111,790

(22) Filed: Aug. 24, 2018

Related U.S. Application Data

(60) Provisional application No. 62/550,744, filed on Aug. 28, 2017.

(51) Int. Cl.
| | |
|---|---|
| *G02B 6/38* | (2006.01) |
| *H01R 13/523* | (2006.01) |
| *H01R 13/52* | (2006.01) |
| *H01R 13/502* | (2006.01) |
| *H01R 13/04* | (2006.01) |
| *H01R 13/40* | (2006.01) |
| *H01R 24/86* | (2011.01) |
| *H01R 105/00* | (2006.01) |

(52) U.S. Cl.
CPC ......... *H01R 13/523* (2013.01); *G02B 6/3816* (2013.01); *H01R 13/5025* (2013.01); *H01R 13/521* (2013.01); *H01R 13/5202* (2013.01); *H01R 13/5219* (2013.01); *H01R 13/04* (2013.01); *H01R 13/40* (2013.01); *H01R 24/86* (2013.01); *H01R 2105/00* (2013.01)

(58) Field of Classification Search
None
See application file for complete search history.

(56) References Cited

U.S. PATENT DOCUMENTS

| | | |
|---|---|---|
| 3,986,508 A | 10/1976 | Barrington |
| 4,080,965 A | 3/1978 | Phillips |
| 4,373,767 A | 2/1983 | Carins |

(Continued)

OTHER PUBLICATIONS

International Search Report and Written Opinion for International Patent Application No. PCT/US2018/047922 dated Oct. 16, 2018.

(Continued)

*Primary Examiner* — John Bedtelyon
(74) *Attorney, Agent, or Firm* — Mark T. Vogelbacker

(57) ABSTRACT

A connector for sealably engaging contacts therein can include a first unit having one or more first contacts that can each include an elongated shaft with a conductive tip. A second unit can have one or more closed chambers therein. Each closed chamber can contain fluid. At least one of the closed chambers can contain one or more second contacts. Each closed chamber can have at least one resilient end wall portion including a bore and a tap integrally formed with the resilient end wall portion. The bore and the tap can create a sealing engagement therebetween when not engaged with the first contact, and create a sealing engagement with the first contact when engaged with the first contact. At least a portion of each closed chamber can be configured to be movable with respect to another portion of the closed chamber.

20 Claims, 7 Drawing Sheets

(56) References Cited

U.S. PATENT DOCUMENTS

| | | | |
|---|---|---|---|
| 4,387,879 | A | 6/1983 | Tauschinski |
| 4,606,603 | A | 8/1986 | Cairns |
| 4,682,848 | A | 7/1987 | Carins et al. |
| 4,907,980 | A | 3/1990 | Wagaman et al. |
| 5,125,055 | A | 6/1992 | Kawanami et al. |
| 5,645,442 | A | 7/1997 | Cairns |
| 5,738,535 | A | 4/1998 | Cairns |
| 5,743,884 | A | 4/1998 | Hasson et al. |
| 6,033,426 | A | 3/2000 | Kaji |
| 7,722,575 | B2 | 5/2010 | Lopez |
| 8,753,317 | B2 | 6/2014 | Osborne et al. |
| 9,246,261 | B2 * | 1/2016 | Hatcher ............... H01R 13/523 |
| 9,263,824 | B2 * | 2/2016 | Cairns .................... H01R 24/38 |
| 9,627,798 | B2 * | 4/2017 | Plant .................... H01R 13/523 |
| 2002/0003931 | A1 | 1/2002 | Carins et al. |
| 2004/0126742 | A1 | 7/2004 | Heasley |
| 2010/0063364 | A1 | 3/2010 | Bonadio et al. |
| 2011/0022068 | A1 | 1/2011 | Aighamdi |
| 2011/0313368 | A1 | 12/2011 | Weaver et al. |
| 2016/0276775 | A1 | 9/2016 | Nicholson |
| 2018/0193627 | A1 | 7/2018 | Carins |
| 2018/0340970 | A1 * | 11/2018 | Emerich ............. G01R 31/045 |

OTHER PUBLICATIONS

U.S. Pat. No. 787,348, Apr. 11, 1905, E. J. Hansen (cited here because the patent section of this form-fillable will not accept this patent number).
Notice from the Search Authority for International Patent Application No. PCT/US2018/012184 dated Mar. 6, 2018.
International Search Report and Written Opinion for International Patent Application No. PCT/US2018/012184 dated May 1, 2018.

* cited by examiner

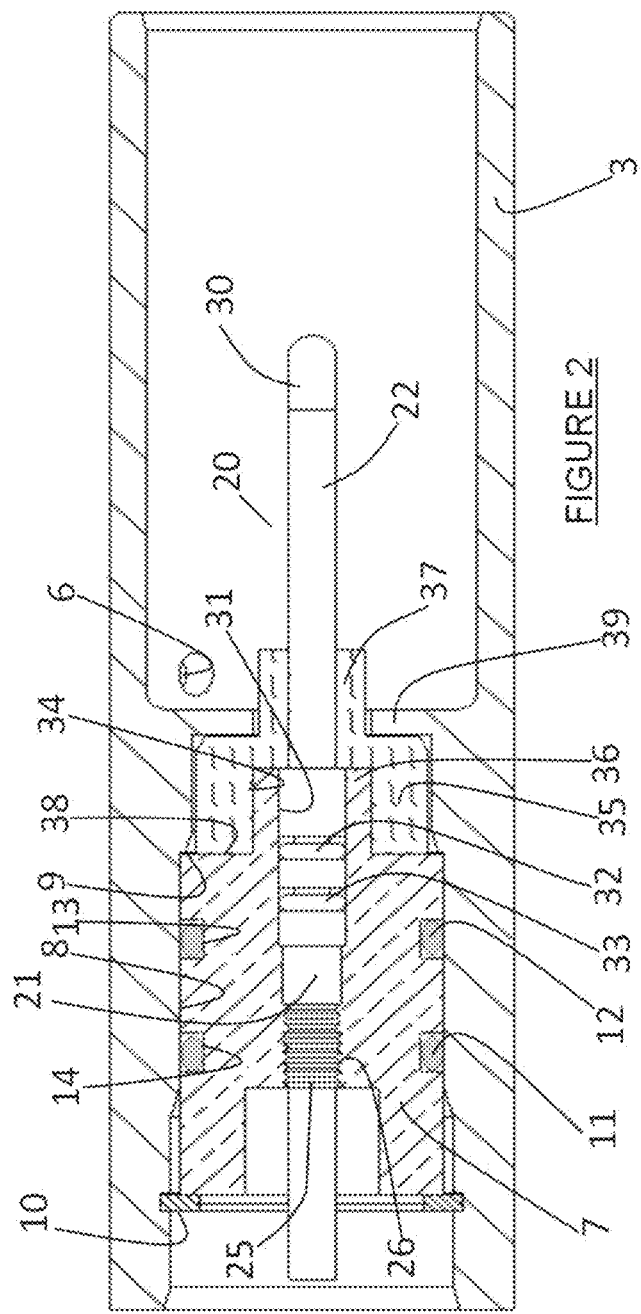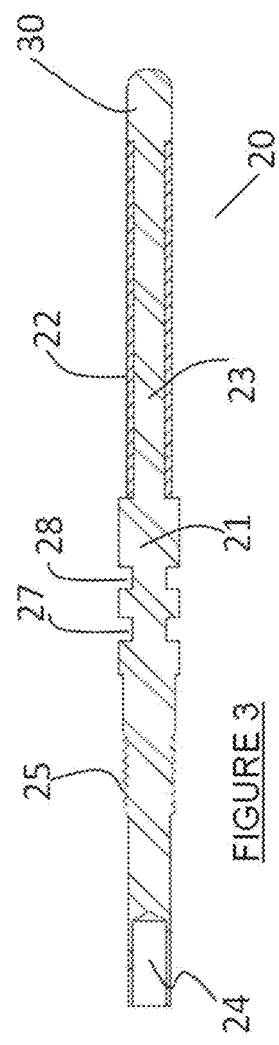
FIGURE 2
FIGURE 3

CONNECTOR FOR SEALABLY ENGAGING AND DISENGAGING CONTACTS, AND METHODS OF MAKING AND/OR USING SAME

CROSS-REFERENCE TO RELATED APPLICATION

The present application claims priority to U.S. Provisional Patent Application No. 62/550,744, filed Aug. 28, 2017 and titled "CONNECTOR FOR SEALABLY ENGAGING AND DISENGAGING CONTACTS," which is hereby incorporated by reference in its entirety.

FIELD OF THE PRESENTLY DISCLOSED TECHNOLOGY

Embodiments of the presently disclosed technology relate to an apparatus for sealably connecting and/or disconnecting electrical and/or fiber optical circuits underwater and/or in other harsh environments, and methods of making and/or using same.

BACKGROUND

In one category of underwater mateable connectors, pin-and-socket contacts are mated in a chamber containing a benign substance that protects them from the external environment. The protective substance, which can be a mobile material such as oil, grease, or gel, hereinafter referred to simply as "fluid" or "oil" for convenience only, is pressure-balanced to the ambient environment by way of a compensating element, which is typically a movable portion of the chamber wall. Connectors of this sort have elongated pins whose shafts are coated to isolate the conductive portions from the environment, and conductive contact tips that extend beyond the protective coating. When mating, the pins enter the fluid-filled chamber by way of penetrable passages through an end seal. The passages are intended to seal the chamber from the outside environment before, during, and after mating and de-mating. Once mated, the conductive pin-tips are completely immersed within the contact chamber fluid, leaving at most a small portion of the protected shafts exposed to the in-situ environment. For ease of discussion, the connector unit in which pins are housed shall hereafter be called the "plug" and the unit housing the sockets within the fluid chamber shall be called the "receptacle."

Some connectors in the above category have blade-like pins; others have pins with rounded cross sections. It is a challenge to keep the receptacle oil chamber sealed from the outside environment before, during, and after inserting and withdrawing the pins. Blade-like pins are able to pass through linear slits in an elastomer chamber end wall. Slits are by nature normally closed, so a bit of additional force across them keeps them sealed. Cylindrical pins, on the other hand, require conforming cylindrical bores through the resilient chamber end seals. To accomplish that more difficult task, one or the other of two different approaches for keeping the bore-like end-seal passages sealed at all times have been employed in the prior art.

In one prior-art approach typified by the electrical connector disclosed in U.S. Pat. No. 5,645,442 ("the '442 patent"), when the connector portions are unmated the elastomeric receptacle end-seal passages are occupied by rigid, non-electrically-conductive, cylindrical stoppers housed within the mating chamber. The stoppers are biased outward by robust springs. During mating, each entering plug pin forces its respective stopper inward beyond the end-seal and further into the mating chamber, thereby compressing its respective biasing spring. The result is that the receptacle mating-chamber end-seal passages are always occupied, either by the stoppers when unmated, or by plug pins when mated. The fluid chamber is thereby always sealed from the outside environment; but this combination of structure requires force to compress the biasing springs, and entails structural complexity. The compressed springs tend to force the plug and receptacle units apart, so some sort of latching mechanism is needed to keep the units mated.

Another approach to the circular end-seal closure challenge is to pinch resilient, tubular, end-seal passages closed when the connector portions are unmated. The force required to keep the circular tubular passages pinched closed is provided either by an elastomeric sphincter surrounding each passage, or by a spring, or by both a spring and an elastomeric sphincter acting together. Upon mating, the pinched tube is forced open by a slender, tapered end of the circular cross-section incoming plug pin, thus remaining sealed against the plug pin's surface during mating and de-mating, and while mated. One example of such a sealed electrical connector is found in U.S. Pat. No. 4,373,767 ("the '767 patent"). Overcoming the substantial force required to pinch a circular end-seal passage completely closed makes mating and de-mating difficult, sometimes resulting in tearing of the tubular passage, and subsequent failure. In addition, the high stress required of such end-seals can be detrimental to the seal's elastomeric properties and can limit its service life. The plug pins are kept slender to minimize stretching of the sphincter and pinched tube, and so are easily damaged by bending forces. These disadvantages compromise the reliability of this sort of connector.

SUMMARY

In addition to the fact that the aforementioned prior-art approaches to seal closure have some technical shortcomings, the complexity and expense of the underwater connectors described in the paragraphs above put them out of reach of many, if not most, harsh environment projects. There are many applications in which it would be desirable to have cylindrical pins similar to those described in the '442 patent, but without the complexity and expense of the prior art products. Pins with rounded cross sections are more robust than blade-like pins, produce a more uniform electrical field, and are more economically manufactured. Rounded cross-section pins are particularly useful for fiber-optic connectors because the majority of fiber-optical contacts are cylindrical. What is still needed in the art is a connector that employs pins with rounded cross sections, while simultaneously reducing the complexity, high mating and/or demating forces, and cost of manufacture. The presently disclosed technology fulfills that and other needs.

Embodiments of the presently disclosed technology described herein provide for an apparatus which can include a first connector unit (hereafter called the "plug") and a second connector unit (hereafter called the "receptacle"), which can be repeatedly connected and disconnected underwater or in other harsh environments without loss of integrity. The described embodiments are, in one application, intended for use subsea, but they could be used in myriad applications wherein pin and socket contacts, when connected, must remain sealed from each other and from the in-situ environment; and when disconnected, the receptacle contacts must remain isolated from each other and from the in-situ environment. The pins and respective sockets of the presently disclosed technology could equally well be optical or electrical; however, for simplicity the invention is described herein with electrical contacts.

In one embodiment of the presently disclosed technology, the plug or a plug unit can house one or more electrical "pins," which can include elongated, cylindrical, insulated shafts with exposed electrically-conductive tips. The receptacle or a receptacle unit can house a respective one or more electrical "sockets" housed in one or more fluid-containing or oil-filled chambers sealed from the exterior environment. When the plug and receptacle units are joined, the one or more plug pins can sealably penetrate respective one or more resilient passages into the receptacle, their conductive tips thereby joining the respective one or more socket contacts within the one or more fluid-containing or oil-filled chambers. The receptacle contacts within the fluid or oil chamber can remain sealed from the outside environment before, during, and/or after mating and demating of the plug and receptacle units.

In another embodiment, the presently disclosed technology is directed to a connector for sealably engaging contacts therein. The connector can include a first unit having one or more first contacts. Each first contact can include an elongated shaft with a conductive tip. A second unit can have one or more closed chambers therein. Each closed chamber can contain fluid. At least one of the one or more closed chambers can contain one or more second contacts. Each second contact can be configured to engage or receive at least a portion of one of the first contacts. Each closed chamber can have at least one resilient end wall portion including a bore and a tap integrally formed with the resilient end wall portion. The bore and the tap can create a sealing engagement therebetween in the absence of an applied force on the tap. When subjected to an applied force on the tap the resilient end wall portion can be configured to (i) permit one of the first contacts to penetrate into the closed chamber without permitting fluid to flow through the bore and (ii) engage one of the second contacts within the closed chamber. At least a portion of each closed chamber can be configured to be movable with respect to another portion of the closed chamber to permit balancing of pressure within the closed chamber to pressure outside the closed chamber.

BRIEF DESCRIPTION OF THE DRAWINGS

A one-circuit embodiment including at least some of the presently disclosed technology's salient features is presented herein in general terms without regard to any specific application. It will be easily understood that the described apparatus can be readily adapted to a wide variety of housings, contact numbers and arrangements, sizes, materials, and/or exterior configurations.

Other features and advantages of the presently disclosed technology will become more readily apparent to those of ordinary skill in the art after reviewing the following detailed description and the accompanying drawings, in which like reference numbers refer to like parts:

FIG. 2 is an axial cross-sectional view of the plug unit of FIG. 1;

FIG. 3 is an axial half-section view of a plug conductor module in accordance with one embodiment of the presently disclosed technology;

DETAILED DESCRIPTION

Figure 1A:
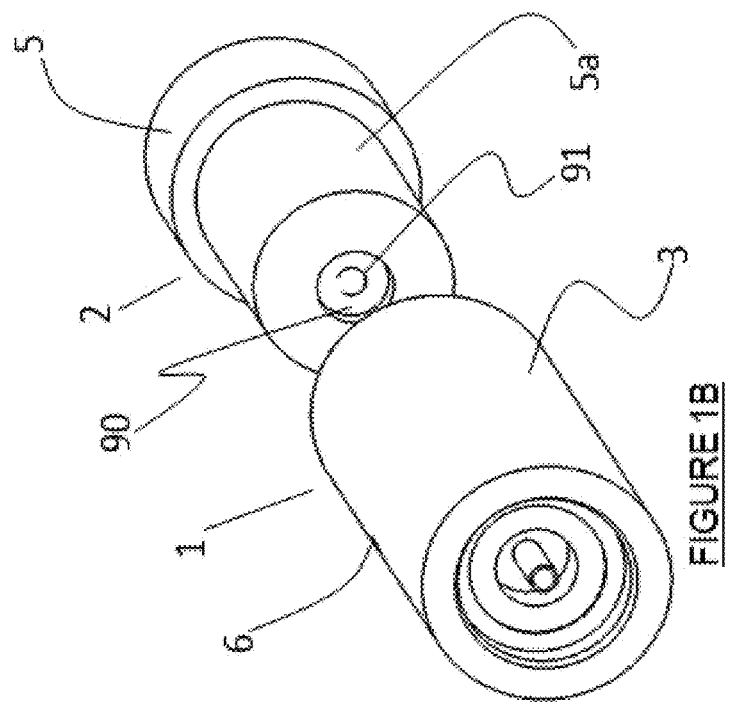
FIG. 1A is a perspective view of connector plug and receptacle units in accordance with one embodiment of the presently disclosed technology, wherein the units are aligned axially in a position for mating.

Certain terminology is used in the following description for convenience only and is not limiting. The words "forward" and "rearward" (and derivations thereof) designate directions in the drawings to which reference is made. Unless specifically set forth herein, the terms "a," "an" and "the" are not limited to one element but instead should be read as meaning "at least one." The terminology includes the words noted above, derivatives thereof and words of similar import.

Figure 1B:
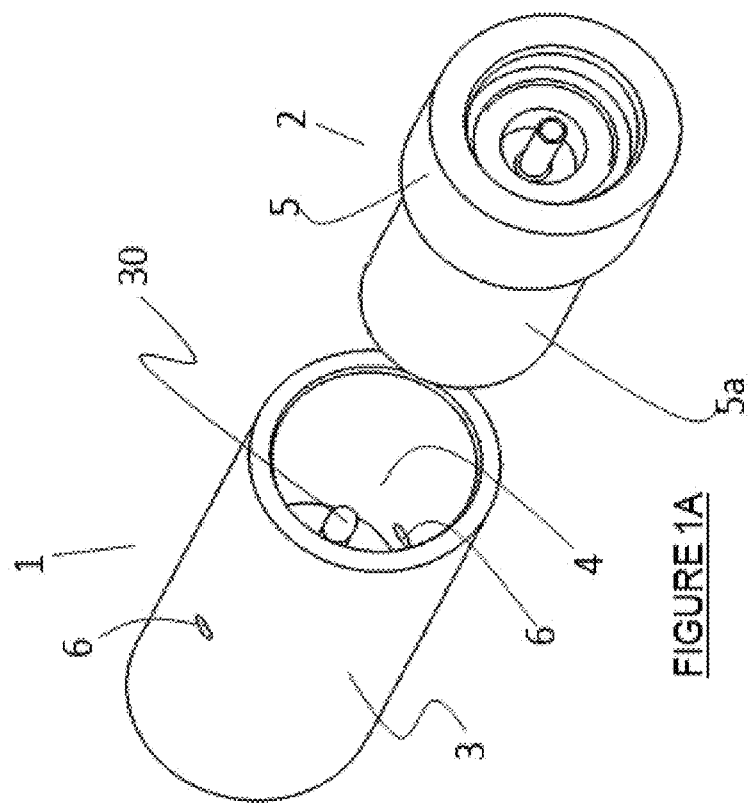
FIG. 1B is another perspective view of plug and receptacle units of FIG. 1.

FIGS. 1A and 1B illustrate a "one-circuit" or single contact pair embodiment of the presently disclosed connector, in which plug or plug unit 1 (sometimes referred to as "first unit") and receptacle or receptacle unit 2 (sometimes referred to as "second unit") are shown aligned axially in position to be mated. Plug shell 3 can include frontal bore 4 sized and/or shaped to receive in axial alignment forward end portion 5a of shell 5 of receptacle 2. Fluid from the surrounding environment that is displaced by the entrance or movement of receptacle 2 into plug bore 4 can be vented out of bore 4 via one or more vent ports or holes 6, which can be radially opposed.

FIG. 2 illustrates one embodiment of plug 1 in axial half-section. Plug base 7 can mount into rear bore 8 of plug shell 3. The forward travel of plug base 7 within the plug 1 can be stopped or at least limited by shoulder 9 of plug shell 3. Plug base 7 can be retained from rearward motion within bore 8 by retainer ring 10. O-rings 11, 12 or other sealing members can be mounted in grooves 13, 14 at least slightly spaced-apart along a longitudinal axis of plug 1 to seal the interface between plug base 7 and bore 8.

Referring to FIGS. 2 and 3, plug contact assembly 20 can include conductor 21 and insulating sheath 22. Conductor 21 can include elongated shaft 23, terminal junction 24, threads 25, spaced-apart O-ring grooves 27, 28, and contact 30 (sometimes referred to as "first contact"). At least a portion of contact assembly 20 can mount within bore 31 of plug base 7. Internal threads 26 of plug base 7 can cooperate with threads 25 on conductor 21 to retain assembly 20 in place within bore 31. O-rings 32, 33 (see FIG. 3) mounted in grooves 27, 28 of conductor 21 can seal the interface between conductor 21 and bore 31.

Socket 34 of elastomeric plug seal 35 can constrictively stretch over at least a portion of forward tubular extension 36 of plug base 7, thereby sealing the interface between plug seal 35 and tubular extension 36. Similarly, forward sleeve 37 of plug seal 35 can constrictively stretch over sheath 22 of contact assembly 20 thereby sealing the interface between seal 35 and sheath 22. Plug seal 35 can be restrained from rearward motion within plug 1 by front wall 38 of plug base 7, and from forward motion by wall 39 of plug shell 3. Sheath 22 can fit tightly over elongated shaft 23 of conductor 21. Sheath 22 can be over-molded or applied onto conductor 21 (e.g., such as by brushing or being sprayed on to conductor 21), or alternately it can be a sleeve made of any of a variety of materials, for instance, from electrically insulating, adhesive, heat-shrink tubing such as that produced by TE Conductivity Corporation.

Figure 4:
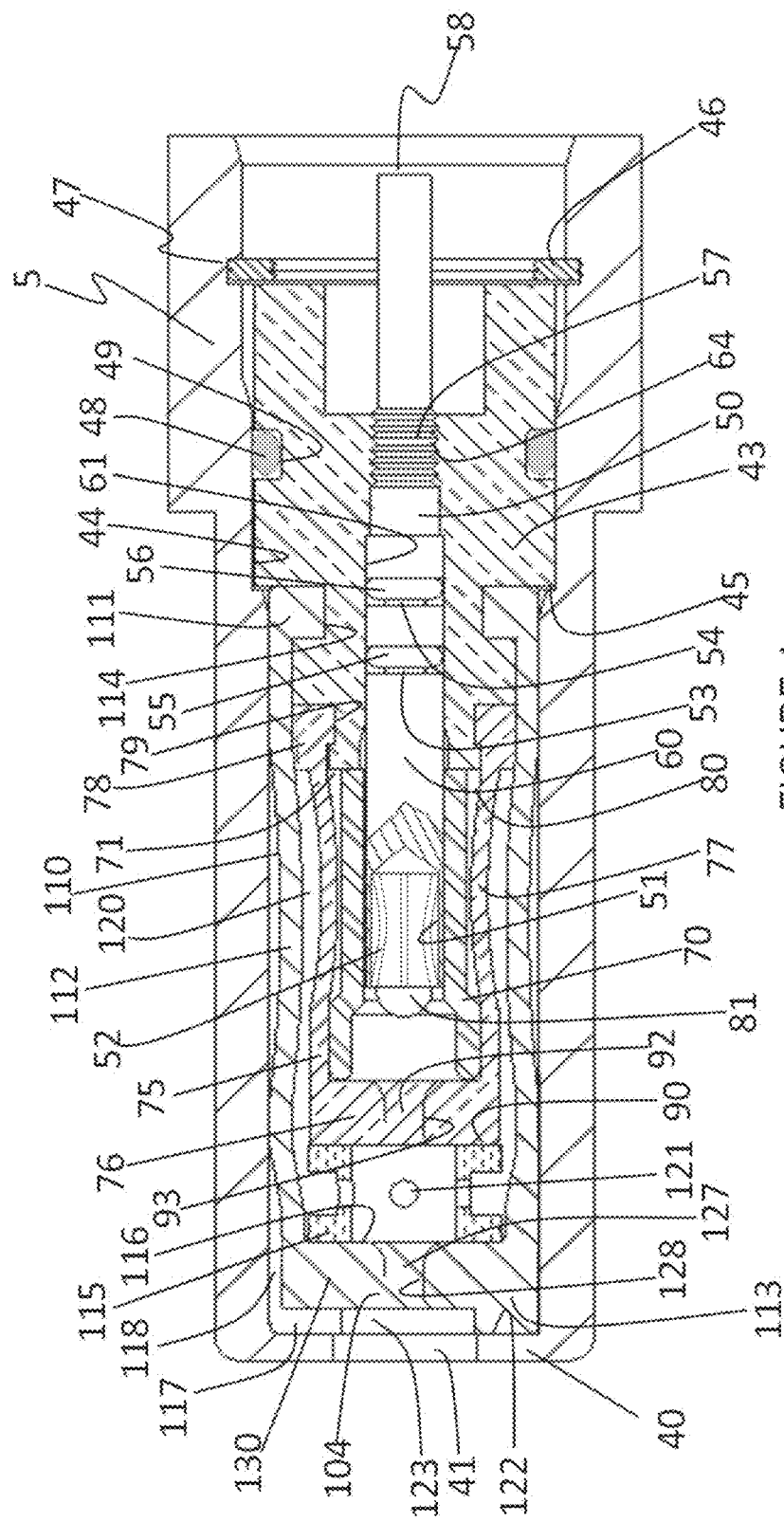
FIG. 4 is an axial cross-sectional view of the receptacle unit of FIG. 1.

FIG. 4 is an axial half-section of one embodiment of receptacle unit 2. Forward end portion 5a of receptacle shell 5 terminates on its forward end in front wall 40, which can include central through-port 41. Port 41 can be sized and/or shown to allow at least a portion of the plug forward elastomeric sleeve 37 to pass through it with some radial clearance when units 1 and 2 are mated. Receptacle base 43 can mount in bore 44 of shell 5. The forward travel or motion of base 43 within the shell 5 can be limited by shoulder 45 of receptacle shell 5. The rearward travel or motion of base 43 can be limited by retainer ring 46 seated in groove 47 of shell 5. O-ring 48 can sit in groove 49 of base 43 and can seal the interface between base 43 and bore 44 of shell 5.

Receptacle contact module 50 can include contact seat 51 (shown partially cutaway in FIG. 4), conductive contact 52 (sometimes referred to as "second contact"), spaced-apart O-ring grooves 53, 54 that can each house one of O-rings 55, 56, threads 57; and terminal junction 58 on its rearward end. Large diameter portion 60 of module 50 can mount in bore 61 of base 43. O-rings 55, 56 can seal the interface between bore 61 and diameter 60 of module 50. Module 50 can be held in place within base 43 by the cooperation of module threads 57 and corresponding threads 64 in base 43.

Bladder spacer 70 can slidably mount over the forward end of contact module 50 with a snug fit. The rearward travel of spacer 70 within receptacle 2 can be limited by front wall 71 of base 43. Spacer 70 can serve to retain inner or internal bladder 75 in position within receptacle unit 2. Internal bladder 75 can include end wall 76, thin cylindrical side wall 77, and rear internal shoulder 78. Internal shoulder 78 can sealably stretch fit into groove 79 of base 43, thus keeping rear shoulder 78 of internal bladder 75 in place while simultaneously sealing its interface with base 43. Internal bladder 75 mounted upon base 43 can define first or inner closed chamber 80 which is filled with fluid. For many applications, the fluid can be Silicone oil such as Dow Corning DC 200, which is benign, dielectric, transparent, and has an index of refraction close to that of many optical fibers. Other fluids or mobile fillers such as grease or gel are certainly possible. The presently disclosed technology is not limited to use with the particular fluids or protective substances explicitly described herein, as other materials can be used. For example, in certain instances, conductive or semi-conductive fluid can be used in one or more of the closed chambers, but that may not provide all of the benefits of using a non-conductive material. First or inner chamber 80 can enclose bladder spacer 70 and the contact portion of contact module 50. Opposed ports 81 can cut radially through spacer 70 to allow free fluid communication from the inside to the outside of spacer 70.

Figure 5:
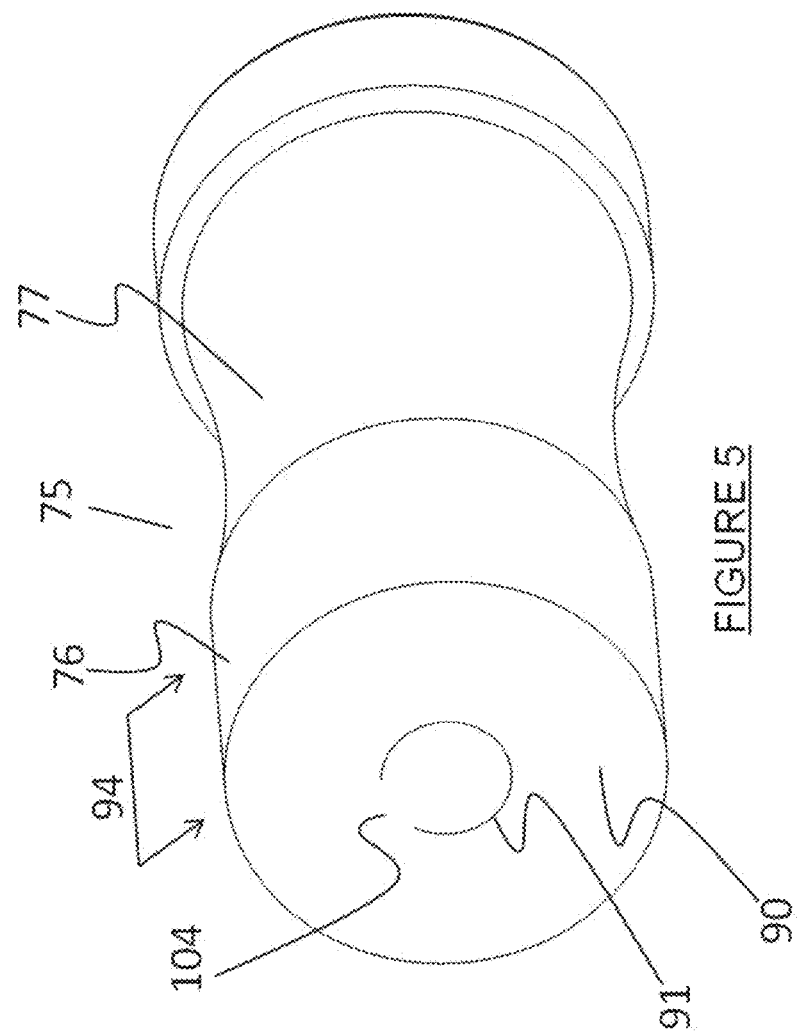
FIG. 5 is a perspective view of a receptacle inner bladder in accordance with one embodiment of the presently disclosed technology.
Figure 6:
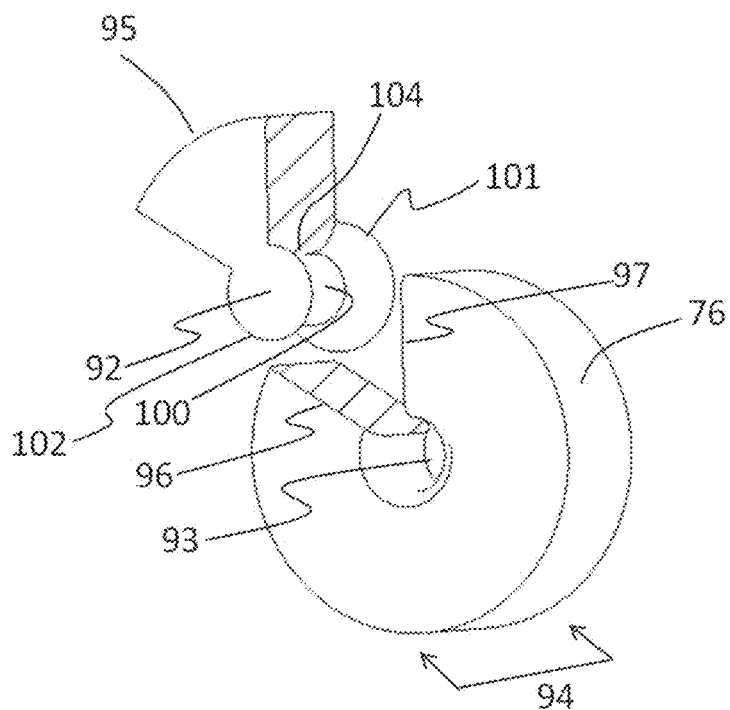
FIG. 6 shows a front wall of the receptacle inner bladder front in perspective with a wedge-shaped section displaced radially.

As shown in FIGS. 5 and 6, end wall 76 of internal bladder 75 can include one or more perforations 91 formed therein or therethrough. In one embodiment, the perforation 91 can be crescent-shaped, thus forming tap 92 and bore 93. Details of the fabrication and operation of one embodiment of such a tap-and-bore seal are disclosed in U.S. Patent Application Publication No. 2018/0193627, which is herein incorporated by reference in its entirety. FIG. 5 is a perspective view of one embodiment of internal bladder 75 showing on face 90 the outline of crescentic perforation 91. In one embodiment, perforation 91 can cut axially through the entire thickness of inner bladder end wall 76, not necessarily with a circular or uniform diameter, thereby resulting in tap 92 and bore 93. End wall 76, tap 92, and bore 93 (see FIGS. 5 and 6) together can form integral or monolithic, penetrable end seal 94 of internal bladder 75. Seal 94 and its integral parts may be easier to visualize in FIG. 6 in which, for purposes of better understanding, a portion 95 is shown cut away axially from end seal 94 along lines 96, 97, which radiate outwardly from the ends of crescentic perforation 91. Cutaway portion 95 is displaced radially in FIG. 6 for clarity. Tap 92 can include central portion 100 having flared segment 101 on one end, and flared segment 102 on the other opposing end. Tap 92 can remain attached to the main portion of end seal 94 by uncut portion 104 of perforation 91. Uncut portion 104 can provide a substantial elastic force to retain tap 92 in its initial or at-rest position within bore 93 when plug and receptacle units 1 and 2 are not mated or connected. Flared end segments 101, 102 of tap 92 can aid in centering the tap axially within bore 93 when connector units 1 and 2 are not mated or connected, and can enhance both the wiping and sealing functions of the tap during the mating and un-mating operations.

Figure 7:
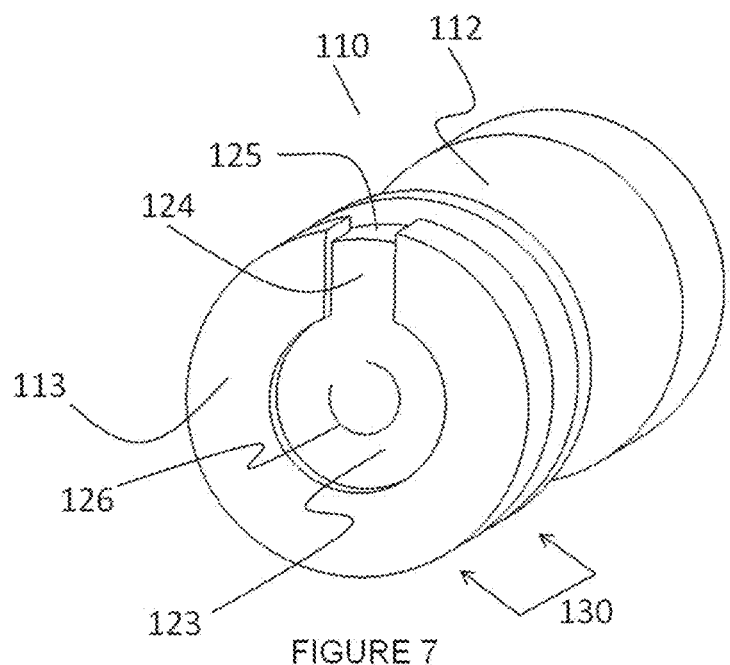
FIG. 7 is a perspective view of a receptacle outer bladder in accordance with one embodiment of the presently disclosed technology.

Referring to FIGS. 4 and 7, external bladder 110 can include rear inward shoulder 111 (see FIG. 4), thin walled or movable portion 112 and end or front wall 113. Inward shoulder 111 can seat or fit stretchable into groove 114 of receptacle base 43, thereby retaining the rear end of external bladder 110 in position while sealing its interface with receptacle base 43. External bladder spacer 115 can be maintained in position radially by outer wall 112 of external bladder 110. The rearward travel or movement of external bladder spacer 115 within receptacle 2 can be limited by front wall 90 of internal bladder 75, and its forward travel or movement can be limited by inner surface 116 of external bladder end wall 113. In other words, external bladder spacer 115 can be positioned between and/or held in place by external bladder 110 and internal bladder 75.

As shown in FIG. 4, external bladder 110 mounted upon or to base 43 can define second or outer closed chamber 120, which can hold or be filled with fluid, such as a benign, non-conductive fluid. Internal bladder 75 mounted upon base 43 can define first or inner closed chamber 80, which can hold or be filled with fluid, which is not necessarily the same as the fluid in chamber 120. For many applications, the fluid can be Silicone oil, such as Dow Corning DC 200, which is benign, dielectric, transparent, and has an index of refraction close to that of many optical fibers. Second or outer closed chamber 120 can enclose or surround both bladder spacer 115 and internal bladder 75. One or more opposed ports 121 can cut radially through spacer 115, thereby allowing free fluid communication within second or outer closed chamber 120 from the inside to the outside of spacer 115.

External bladder front wall 113 can butt against or be in contact with inner surface 122 of front wall 40 of receptacle shell 5. Recess 123 in front wall 113 can communicate via opening 41 in receptacle shell 5 to the external environment. Referring to FIG. 7, radial extension 124 of recess 123 can connect to slot 125 in the outer radius of external bladder front wall 113, thereby providing a ventilation path from the external environment to the outer surface of external bladder thin wall portion 112. The ventilation of thin wall portion 112 to the external environment allows thin wall 112 to equalize the fluid pressure within second or outer chamber 120, and hence also within first or inner chamber 80, to the external environmental pressure.

External bladder end wall 113 of external bladder 110 can be cut through with a crescent-shaped perforation 126 resulting in tap 127 and bore 128 (see FIG. 4), which can be integral parts of the external bladder end wall 113. Perforation 126, tap 127, and bore 128 in external bladder end wall 113 of external bladder 110 can be equivalent or even identical to perforation 91, tap 92, and bore 93 of internal bladder 75, as described earlier and shown in FIGS. 5 and 6. Taken together, external bladder end wall 113 with its integral tap and bore features constitute end seal 130 (see FIG. 7) of external bladder 110.

To briefly summarize the basic construction of one embodiment of receptacle unit 2, socket contacts 52 can be contained within sealed first oil chamber 80. First chamber 80 can further be contained within second sealed oil chamber 120. These chambers can have respective flexible walls 77, 112 that can equalize their internal pressures to the outside ambient pressure. Chambers 80 and 120 can have respective tap-and-bore end seals that are normally closed when plug unit 1 and receptacle unit 2 are not mated.

Figure 8:
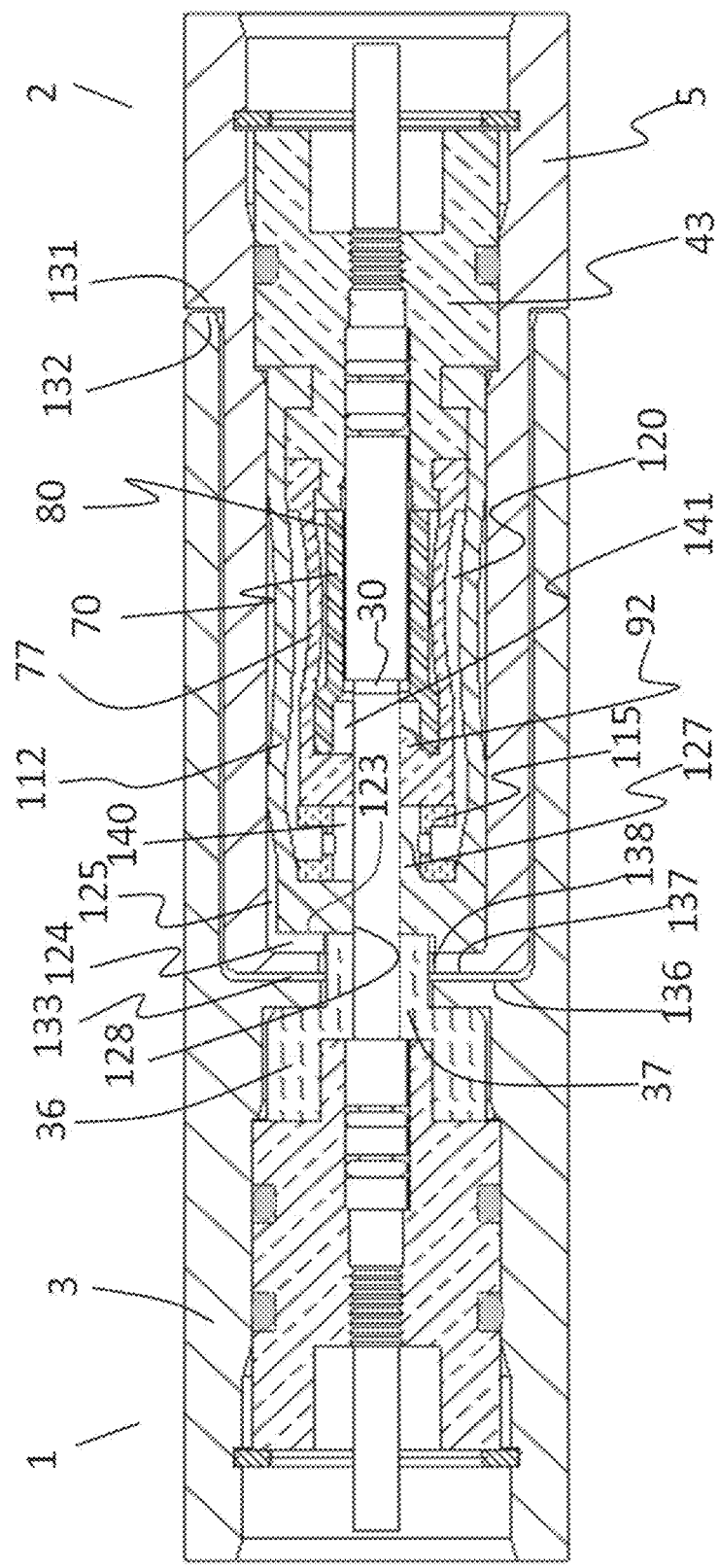
FIG. 8 is an axial half-section view of the mated connector of the components shown in FIG. 1.

FIG. 8 illustrates an axial cross-sectional view of one embodiment of the mated connector plug and receptacle units 1 and 2. In one embodiment, in the first step of the mating sequence, receptacle shell forward portion 5a can enter bore 4 of plug shell 3, thereby aligning the connector units axially. As insertion proceeds further, plug contact 30 encounters or contacts the forward face of tap 127, and proceeding further yet, forces tap 127 at least slightly inward into space 140 of external bladder spacer 115. As tap 127 is forced inward by entering plug contact 30, the uncut portion of perforation 126 that connects tap 127 to external bladder end wall 113 (e.g., equivalent to 104 in FIG. 6) can be stretched inwardly. A portion of tap 127 also can be simultaneously pressed firmly against bore 128, somewhat distorting external bladder end wall 113. The net result of these actions taken together is that as plug contact 30 passes through bore 128, tap 127 moves elastically inward and out of the way. Contact 30 can pass into space 140 of external bladder spacer 115, which, being an integral part of chamber 120, can be filled with or contain fluid (e.g. oil). The fluid displaced by the entering plug pin can be compensated for by a distortion of thin-walled portion 112 of external bladder 110. As plug contact 30 passes through bore 128, it can be wiped clean of any surface contamination, and upon entering fluid-filled space 140 it is bathed in fluid (e.g., oil).

As the mating of units 1 and 2 proceeds further, at least a portion of contact 30 can encounter the forward face of tap 92 (see FIGS. 6 and 8). Proceeding further yet, at least a portion of contact 30 can force tap 92 elastically inward into space 141 of internal bladder spacer 70 (see FIG. 8). As tap 92 is forced inward by entering plug contact 30, the uncut portion of perforation 91 that connects tap 92 to end wall 90 (see FIG. 6) can elastically distort inwardly. A portion of tap 92 can be simultaneously pressed firmly against bore 93, also elastically distorting end wall 94. As plug contact 30 passes through bore 93 it can, once again, be wiped partially or entirely clean. With further insertion, contact 30 can pass into space 141 of internal bladder spacer 70, which, being an integral part of first or inner chamber 80, can contain or be filled with fluid (e.g., oil). The fluid displaced by the entering the plug pin or contact 30 can be compensated for by a distortion of thin-walled portion 77 of internal bladder 75.

In one embodiment, the mating of units 1 and 2 is complete when shoulder 131 of receptacle shell 5 is in close proximity to, contacts and/or butts against forward end 132 of plug shell 3. At this point, both bores 93 and 127 can be sealably occupied (e.g., such that no or negligible amounts of fluid can pass therethrough) by elongated shaft 23 encased within insulated sheath 22 of plug contact module 20, and plug contact 30 can be located within receptacle contact seat 51 (see FIG. 4) and firmly engaged with receptacle contact 52. In one embodiment, the mated contacts are protected by two elastomeric barriers and two fluid (e.g., oil) baths from the hostile outside environment. When fully mated, elastomeric forward sleeve 37 of plug seal 35 can be pressed sealably against recess 123 of external bladder 110, such that no portion of conductor module 20 is exposed to the external environment.

De-mating or separating of plug and receptacle units 1 and 2 is the reverse of the mating sequence described above. In particular, as plug contact 30 withdraws from bores 93 and 128, taps 92 and 127, respectively, are drawn outward both by friction with exiting contact module 20 and by the elastic restoring forces provided by the uncut portions of end walls 96, 113 which attach the taps to their bores. Forward flared tap ends 102 (see FIG. 6) can assist in wiping the bores clean as they follow the contact module 20 withdrawal. Rearward flared tap ends 101 (see FIG. 6) can assist upon withdrawal of contact 30 in sealing the bores.

Referring again to FIG. 8, when the plug and receptacle units are fully engaged, external environmental fluid is able to act upon and/or interact with thin wall portion 112 of external receptacle bladder 110 for purposes of equalizing fluid pressure within fluid chambers 80 and 120, as follows: In one embodiment, radially opposed vent holes 6 in plug shell 3 (see FIGS. 1A, 1B and 2) can communicate freely (e.g., allow fluid to pass) with space 133 between mated faces 136, 137 of plug 1 and receptacle 2, and thence through clearance 138 between the forward elastomeric sleeve 37 of plug seal 36 and central through-port 41 of receptacle shell 5. From there, the ventilation or fluid path extends through radial extension 124 of recess 123 in front wall 113 of external bladder 110, and onward through slot 125 in the outer radius of front wall 113 (FIG. 7), thereby providing a ventilation or fluid path from the external environment to the outer surface of external bladder wall portion 112.

The presently disclosed technology has been described herein as an example for connecting electrical circuits, incorporating plug electrical contact assembly 20 and receptacle electrical contact assembly 50; however, as mentioned earlier, the presently disclosed technology can equally well be used to connect other devices, such as optical fiber circuits. Pin-and-socket optical junctions suitable for incorporation into the presently disclosed technology are readily available in at least two main types. One type employs quarter-wavelength beam collimating lenses, as taught in U.S. Pat. No. 4,606,603 ("the '603 Patent"). Another suitable type includes straight-terminal contacts as used in U.S. Pat. No. 5,738,535 ("the '535 Patent"). Both quarter-wavelength and straight-terminal optical contacts are readily available commercially through ThorLabs, Inc. The inventions described in both the '603 and the '535 Patents mount the optical plug contact on the tip of an insulated shaft, and contact is made when the contact tip enters a receptacle oil chamber wherein it makes contact with the optical socket. One important difference between the technologies of the '603 and the '535 Patents and the presently disclosed technology lies in the structure of the receptacle chamber end seals. Another important difference is that in the presently disclosed technology the plug contact is wiped through two elastomeric barriers, and passes through two receptacle fluid baths before making contact with the receptacle contact. Both of these differences add to the reliability of the connector while the simplicity of the seals of the presently disclosed technology adds to its economy.

Figure 9:
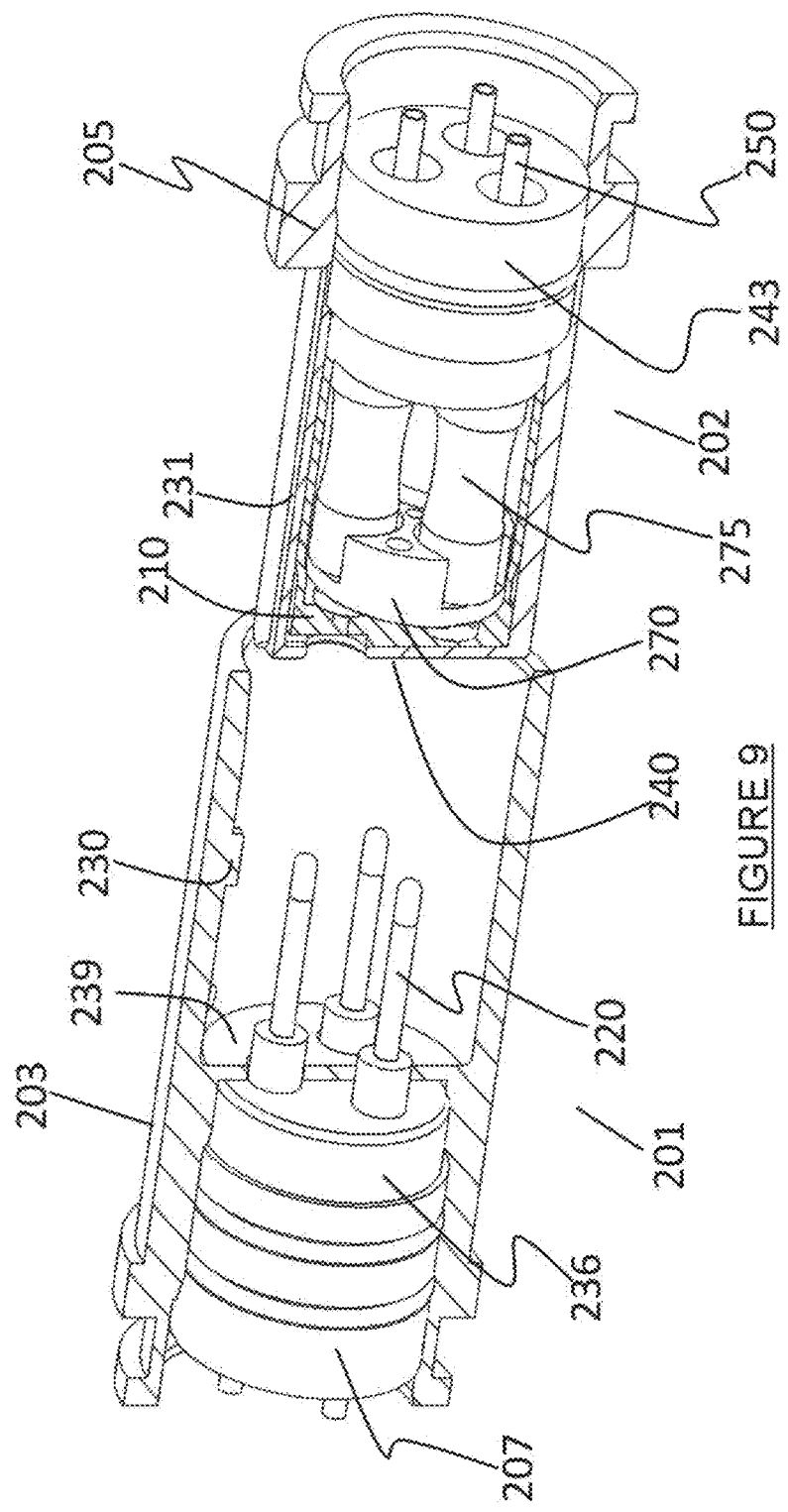
FIG. 9 is a partially cut-away perspective view of a multiple contact connector in accordance with one embodiment of the presently disclosed technology.

The preceding description relates to a one-circuit connector. But the presently disclosed technology is not limited to one-circuit applications. FIG. 9 is a perspective view of a three-circuit connector to illustrate how one embodiment of the presently disclosed technology can easily be configured for multiple circuits or multiple contact pairs. The outer shells, the external bladder and external bladder spacer (which can be substantially similar to those described above) have been cut away axially in FIG. 9. Because there are multiple circuits, plug 201 and receptacle 202 are rotationally aligned. Plug shell 203 can include one or more keys 230, which can extend radially inwardly from plug shell 203 and seat in or extend at least partially into a keyway 231 of receptacle shell 205. Plug base 207 can be equipped with three positions for mounting a respective three plug contact modules 220. Plug shell 203 can have three spaced-apart ports in its forward wall 239 to accommodate the three contact modules 220. Receptacle base 243 can have three positions for mounting a respective three receptacle contact modules 250 and receptacle shell 205 correspondingly can have three spaced-apart ports in its forward wall 240. A corresponding three spaced-apart internal bladders 275, each housing the same internal parts as in the one-circuit example, can be provided for each of the three circuits. A common external receptacle bladder spacer 270 can be configured for three circuits, all of which can be enclosed in common external bladder 210.

The foregoing discussion illustrates that the presently disclosed technology provides a reliable connector embodying multiple levels of protection for the circuits from the in-situ environment, while doing so with an uncomplicated and economical construction. In one embodiment, the presently disclosed technology houses the receptacle contacts within nested oil chambers. The chambers have relatively simple, independent, active closure means to keep them sealed from each other, and from the outside environment. One embodiment of the presently disclosed technology is further distinguished from prior art by the fact that every conductive element of the mated plug and receptacle units is at least doubly sealed from the harsh working environment. No segments of the plug pins, for instance, are exposed to the in-situ environment when the connector units are mated. The presently disclosed technology permits connector units to be built in a wide range of sizes and resistant materials making them suitable for both light and heavy duty applications. Compared to prior art connectors now on the market, the relative simplicity of the presently disclosed technology makes it particularly adaptable for miniaturization or other changes in size.

In one embodiment, the presently disclosed technology is directed to a method of engaging the one or more second contacts of the receptacle of the connector to the one or more first contacts of the plug of the connector and/or disengaging the one or more second contacts of the receptacle of the connector from the one or more first contacts of the plug of the connector. The method includes inserting at least a portion of one of the first contacts of the plug into the at least one closed chamber of the receptacle such that the first contact sealably penetrates into the closed chamber by displacing the tap from the closed position and engaging one of the second contacts within the closed chamber. Optionally, the method can further include subsequently sealably withdrawing the first contact from the closed chamber thereby allowing the tap to return to the closed position.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the presently disclosed technology. For example, although embodiments having a first, outer closed chamber surrounding a second, inner closed chamber are described above, the presently disclosed technology could work well with a single closed chamber. Thus, it is to be understood that the description and drawings presented herein represent presently preferred embodiments of the presently disclosed technology and are, therefore, representative of the subject matter which is broadly contemplated by the presently disclosed technology. It is further understood that the scope of the invention fully encompasses other embodiments that may become obvious to those skilled in the art and that the scope of the invention is accordingly limited by nothing other than the appended claims.

I claim:

1. A connector for sealably engaging and disengaging contacts therein, the connector comprising:
    a first unit having one or more first contacts, each first contact including an elongated shaft with a conductive tip; and
    a second unit having one or more closed chambers therein, each closed chamber containing fluid, at least one of the one or more closed chambers containing one or more second contacts, each second contact being configured to engage one of the first contacts, each closed chamber having at least one resilient end wall portion including a bore and a tap integrally formed with the resilient end wall portion, the tap being movable from a closed position to an open position with respect to the bore, the end wall portion being configured to permit one of the first contacts to (i) sealably penetrate into the closed chamber by displacing the tap from the closed position and engage one of the second contacts within the closed chamber, and (ii) be subsequently sealably withdrawn from the closed chamber thereby allowing the tap to return to the closed position, at least a portion of each closed chamber being configured to be movable with respect to another portion of the closed chamber to permit balancing of pressure within the closed chamber to pressure outside the closed chamber.

2. The connector of claim 1, wherein at least one set of the first and second contacts are electrical contacts, and wherein the fluid is a dielectric fluid.

3. The connector of claim 1, wherein at least one set of the first and second contacts are optical contacts, and wherein the fluid is an optically transparent fluid.

4. The connector of claim 1, wherein each first contact has a rounded cross-section.

5. The connector of claim 1, wherein the tap and bore are formed by a crescentic-shaped cut through the resilient end wall portion.

6. The connector of claim 5, wherein an outer shape of the tap conforms to a shape of the bore.

7. The connector of claim 6, wherein the bore is flared outward on at least one end.

8. The connector of claim 1, wherein each closed chamber is an inner closed chamber, and wherein the second unit further comprises an outer closed chamber outward of each inner closed chamber, wherein each inner and outer closed chamber contains fluid.

9. The connector of claim 8, wherein at least a portion of each outer closed chamber is configured to be movable with respect to another portion of the outer closed chamber to permit balancing of pressure within the outer closed chamber to pressure outside the outer closed chamber.

10. The connector of claim 8, wherein each outer closed chamber includes a resilient end wall portion including a bore and a tap integrally formed with the resilient end wall portion, the bore and the tap creating a sealing engagement therebetween when not penetrated by the first contact, and creating a sealing engagement with the first contact when penetrated by the first contact.

11. A connector comprising:
 a first unit having one or more first contacts, each first contact including an elongated shaft with a conductive tip; and
 a second unit having one or more closed chambers therein, each closed chamber containing fluid, at least one of the closed chambers containing one or more second contacts, each second contact being configured to engage one of the first contacts, each closed chamber having at least one resilient end wall portion including a bore and a tap integrally formed with the resilient end wall portion, the tap being movable from a closed position to an open position with respect to the bore, the end wall portion being configured to permit one of the first contacts to sealably penetrate into the closed chamber by displacing the tap from the closed position and engage one of the second contacts within the closed chamber.

12. The connector of claim 11, wherein at least a portion of each closed chamber is configured to be movable with respect to another portion of the closed chamber to permit balancing of pressure within the closed chamber to pressure outside the closed chamber.

13. The connector of claim 11, wherein each closed chamber is an inner closed chamber, and wherein the second unit further comprises an outer closed chamber outward of each inner closed chamber, wherein each inner and outer closed chamber contains fluid.

14. The connector of claim 13, wherein at least a portion of each outer closed chamber is configured to be movable with respect to another portion of the outer closed chamber to permit balancing of pressure within the outer closed chamber to pressure outside the outer closed chamber.

15. The connector of claim 11, wherein the tap and bore are formed by a crescentic-shaped cut through the resilient end wall portion, wherein an outer shape of the tap conforms to a shape of the bore, and wherein the bore is flared outward on at least one end.

16. The connector of claim 11, wherein at least one set of the first and second contacts are electrical contacts, and wherein the fluid is a dielectric fluid.

17. The connector of claim 11, wherein at least one set of the first and second contacts are optical contacts, and wherein the fluid is an optically transparent fluid.

18. The connector of claim 11, wherein the end wall portion is configured to permit one of the first contacts to be sealably withdrawn from the closed chamber thereby allowing the tap to return to the closed position.

19. A receptacle of a connector for sealably engaging and disengaging contacts therein, the receptacle comprising:
 one or more closed chambers, each closed chamber containing fluid, at least one of the closed chambers containing one or more receptacle contacts, each receptacle contact being configured to engage one of one or more plug contacts of a plug of the connector, each closed chamber having at least one resilient end wall portion including a bore and a tap integrally formed with the resilient end wall portion, the tap being movable from a closed position to an open position with respect to the bore, the end wall portion being configured to permit one of the plug contacts to (i) sealably penetrate into the closed chamber by displacing the tap from the closed position and engage one of the receptacle contacts within the closed chamber, and (ii) be subsequently sealably withdrawn from the closed chamber thereby allowing the tap to return to the closed position, at least a portion of each closed chamber being configured to be movable with respect to another portion of the closed chamber to permit balancing of pressure within the closed chamber to pressure outside the closed chamber.

20. The receptacle of claim 19, wherein the tap and bore are formed by a crescentic-shaped cut through the resilient end wall portion, wherein an outer shape of the tap conforms to a shape of the bore, and wherein the bore is flared outward on at least one end.

* * * * *